(12) United States Patent
Caretta et al.

(10) Patent No.: US 7,276,131 B2
(45) Date of Patent: Oct. 2, 2007

(54) METHOD OF MAKING A TIRE FOR A VEHICLE WHEEL

(75) Inventors: Renato Caretta, Gallarate (IT); Fiorenzo Mariani, Biassono (IT)

(73) Assignee: Pirelli Pneumatici S.p.A., Milan (IT)

( * ) Notice: Subject to any disclaimer, the term of this patent is extended or adjusted under 35 U.S.C. 154(b) by 80 days.

(21) Appl. No.: 10/851,986

(22) Filed: May 24, 2004

(65) Prior Publication Data

US 2005/0028918 A1    Feb. 10, 2005

Related U.S. Application Data

(63) Continuation of application No. 09/873,330, filed on Jun. 5, 2001, now abandoned, which is a continuation of application No. 09/198,241, filed on Nov. 24, 1998, now abandoned.

(60) Provisional application No. 60/098,380, filed on Aug. 28, 1998.

(30) Foreign Application Priority Data

Nov. 28, 1997  (EP) .................................. 97830633

(51) Int. Cl.
  *B29D 30/14* (2006.01)
  *B29D 30/16* (2006.01)
(52) U.S. Cl. ................... 156/117; 156/130.7; 156/133; 156/135
(58) Field of Classification Search ................ 156/117, 156/397, 123, 133, 125, 130, 130.7; 152/552, 152/510, 548, 550, 558, 560, 523, 524
See application file for complete search history.

(56) References Cited

U.S. PATENT DOCUMENTS

| | | | |
|---|---|---|---|
| 990,392 | A | 4/1911 | Rowley |
| 1,193,715 | A | 8/1916 | Price |
| 1,420,611 | A | 6/1922 | Dickinson |
| 1,603,855 | A | 10/1926 | Midgley |
| 1,603,858 | A | 10/1926 | Midgley |
| 3,356,553 | A | 12/1967 | Frazier |

(Continued)

FOREIGN PATENT DOCUMENTS

EP    0461464    12/1991

(Continued)

*Primary Examiner*—Geoffrey L. Knable
(74) *Attorney, Agent, or Firm*—Finnegan, Henderson, Farabow, Garrett & Dunner, L.L.P.

(57) ABSTRACT

A method of making a tire includes making a carcass structure; applying a belt structure, tread band, and at least one pair of sidewalls; and vulcanizing the tire. Making the carcass structure involves formation of at least one first carcass ply, including preparing and depositing at least one continuous strip element onto a toroidal support in alternating deposition sections. Each deposition section extends in a substantially U-shaped conformation against a profile in transverse section of the toroidal support or a previously deposited deposition section, substantially over an entire length of the section, to define two side portions, a crown portion, and two transition regions defined between the side and crown portions. The crown portions of the deposition sections are arranged consecutively in side-by-side relationship along a circumferential extension of the toroidal support. Edges of circumferentially consecutive deposition sections abut evenly along their entire crown portions extending between the transition regions.

31 Claims, 9 Drawing Sheets

U.S. PATENT DOCUMENTS

| | | | |
|---|---|---|---|
| 3,580,781 A | 5/1971 | Hollis et al. |
| 3,833,437 A | 9/1974 | Appleby et al. |
| 4,589,460 A | 5/1986 | Albee |
| 4,743,322 A | 5/1988 | Holroyd et al. |
| 4,963,207 A | 10/1990 | Laurent |
| 4,983,239 A | 1/1991 | Holroyd et al. |
| 5,267,595 A | 12/1993 | Lampe |
| 5,453,140 A | 9/1995 | Laurent et al. |
| 6,318,432 B1 | 11/2001 | Caretta et al. |
| 6,328,084 B1 | 12/2001 | Caretta et al. |
| 6,457,504 B1 | 10/2002 | Caretta |
| 6,623,584 B2 | 9/2003 | Caretta |
| 6,763,868 B1 | 7/2004 | Caretta |
| 2001/0023737 A1 | 9/2001 | Caretta et al. |
| 2001/0042587 A1 | 11/2001 | Caretta et al. |
| 2002/0011297 A1 | 1/2002 | Caretta et al. |
| 2002/0023700 A1 | 2/2002 | Caretta |
| 2002/0029841 A1 | 3/2002 | Caretta et al. |
| 2002/0056498 A1 | 5/2002 | Caretta et al. |
| 2002/0153081 A1 | 10/2002 | Caretta |
| 2002/0189737 A1 | 12/2002 | Caretta |
| 2004/0055688 A1 | 3/2004 | Caretta |

FOREIGN PATENT DOCUMENTS

| | | |
|---|---|---|
| EP | 0481805 | 4/1992 |
| EP | 0664231 | 7/1995 |
| EP | 0664232 | 7/1995 |
| FR | 1317045 | 4/1963 |
| FR | 2663884 | 1/1992 |
| WO | WO89/02492 | 3/1989 |

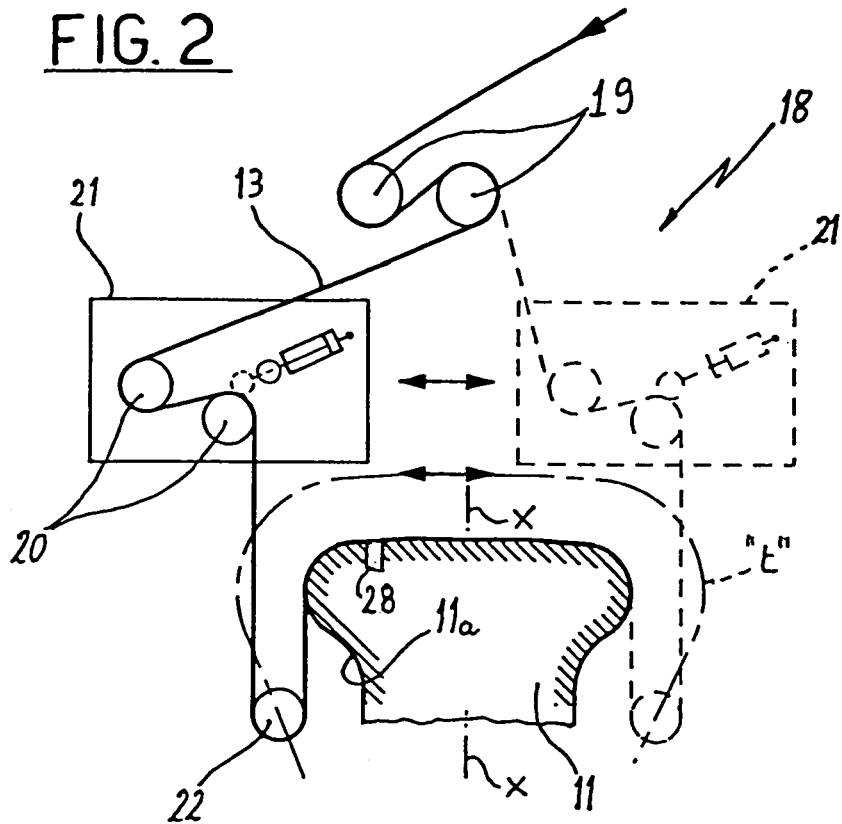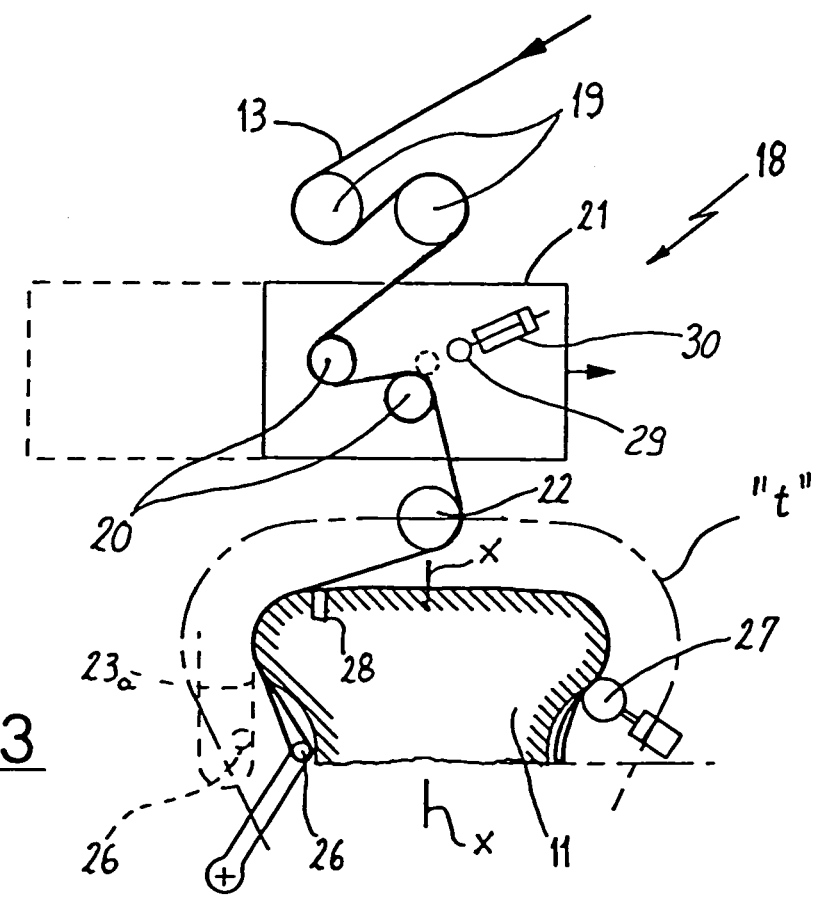

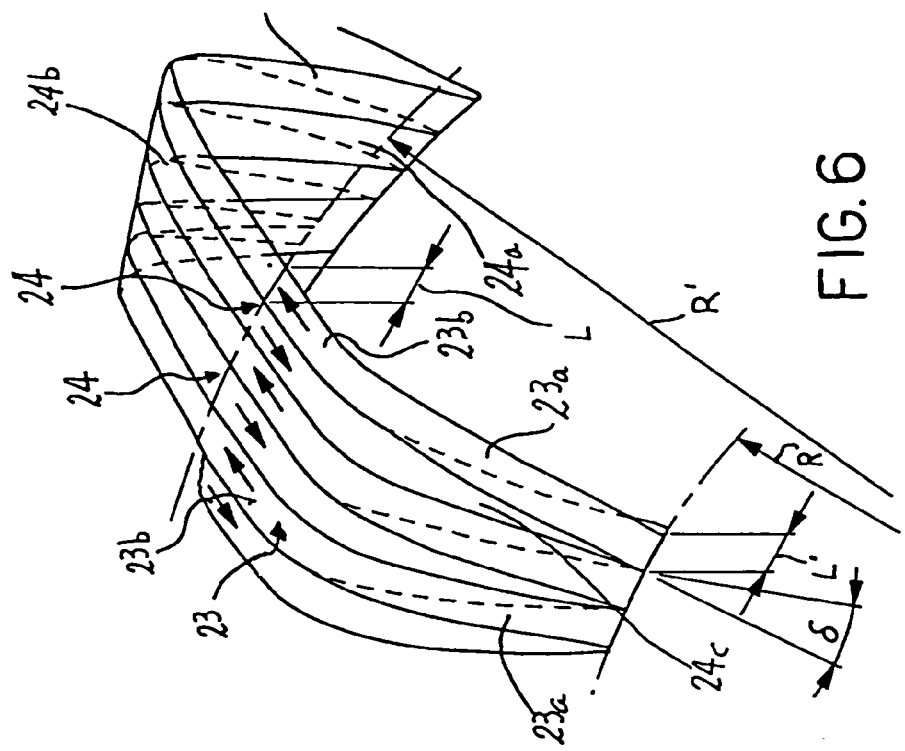
FIG. 6
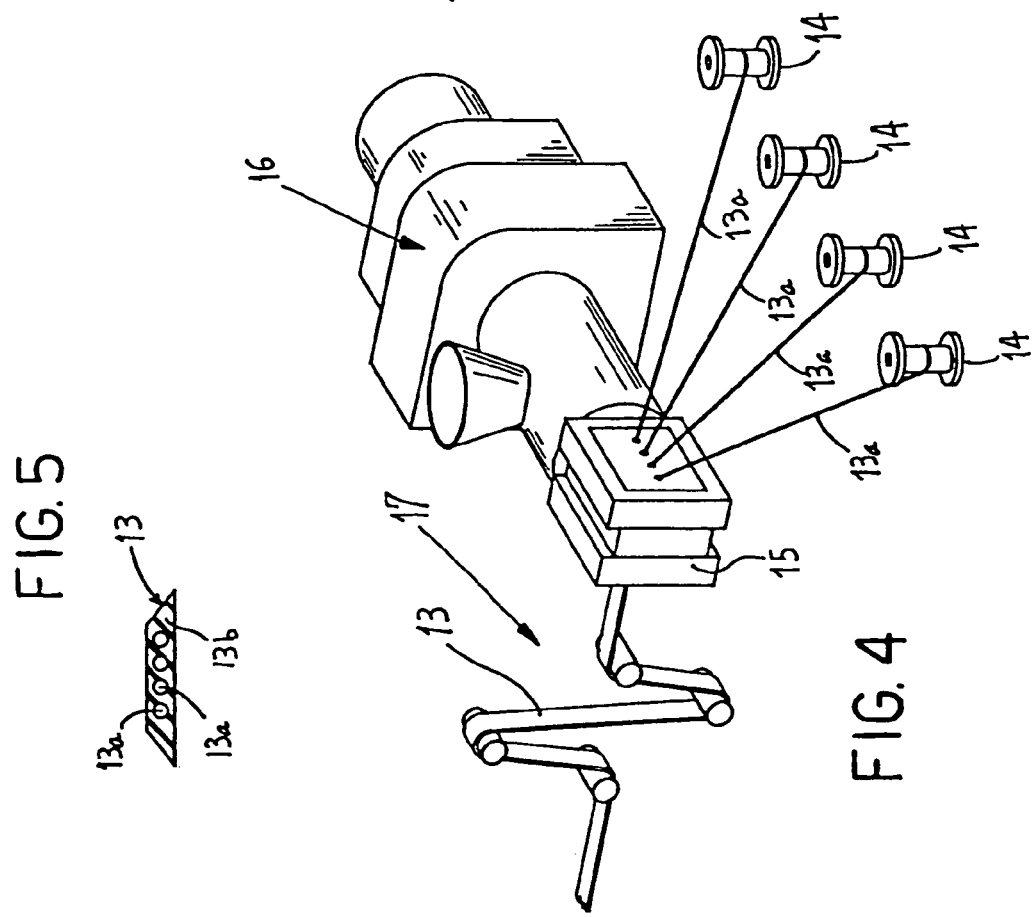
FIG. 5
FIG. 4

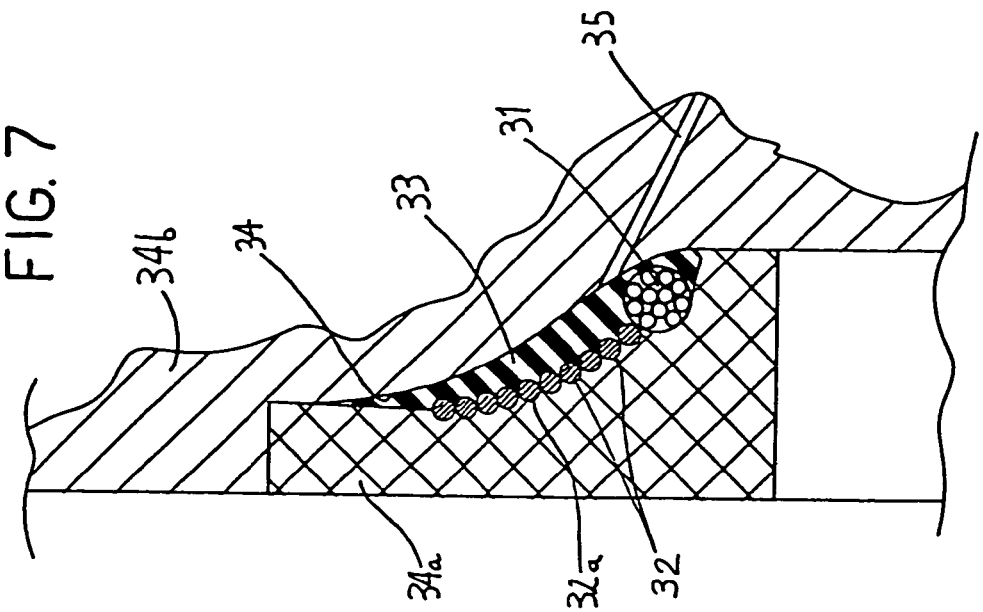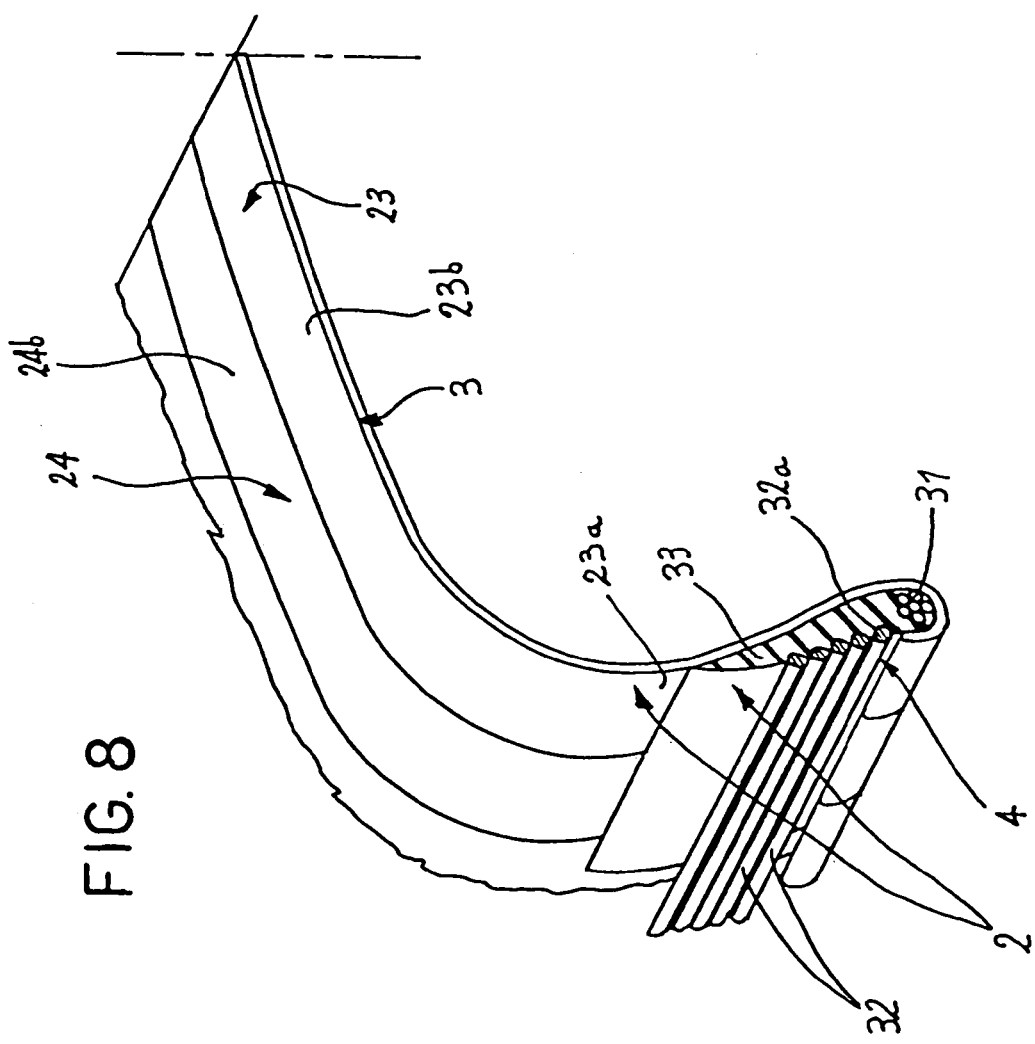

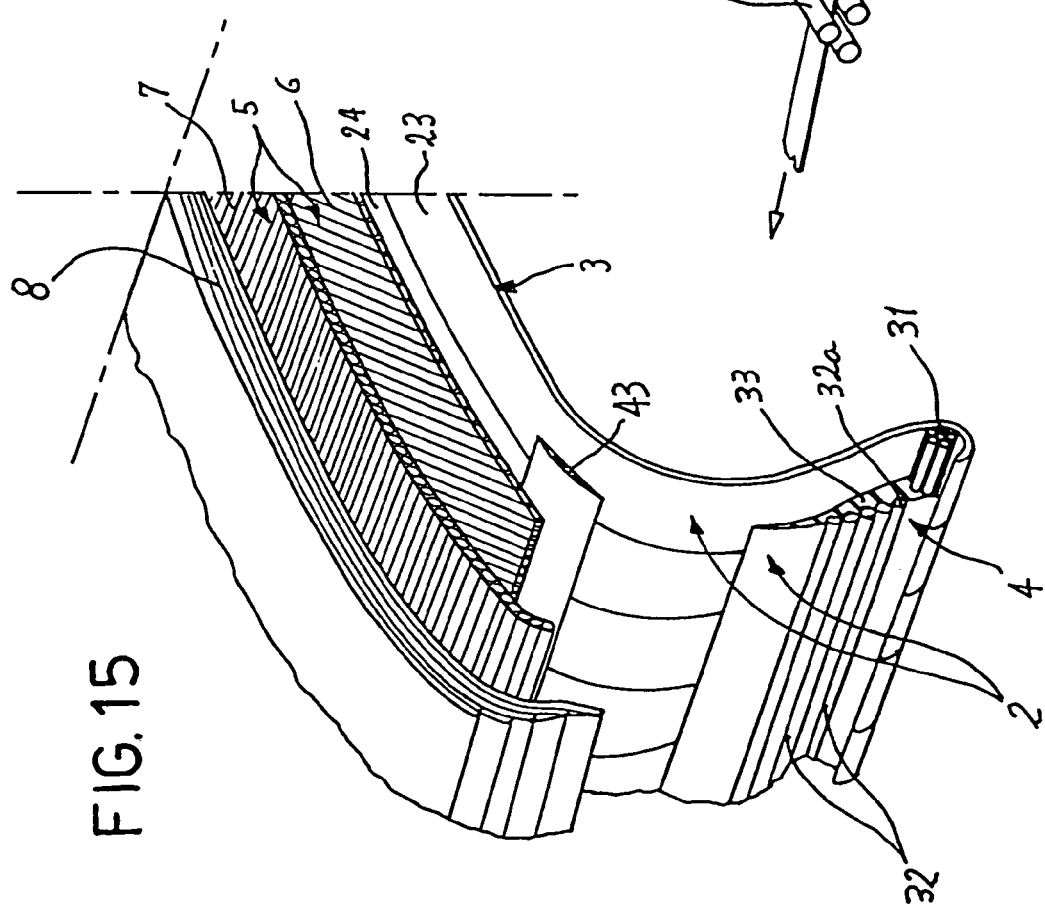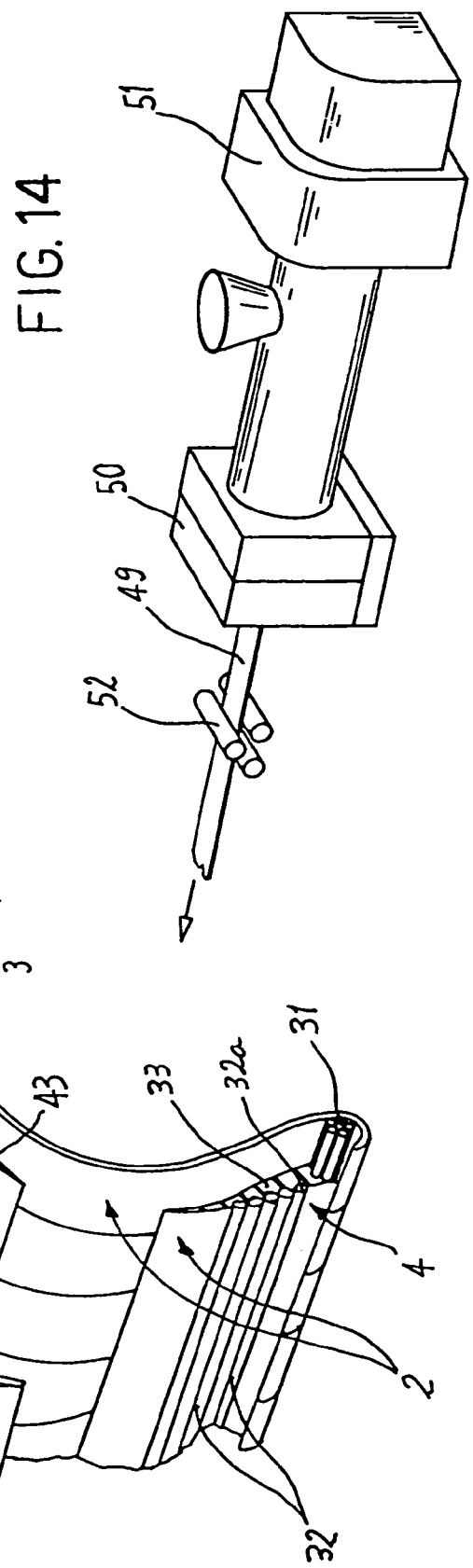

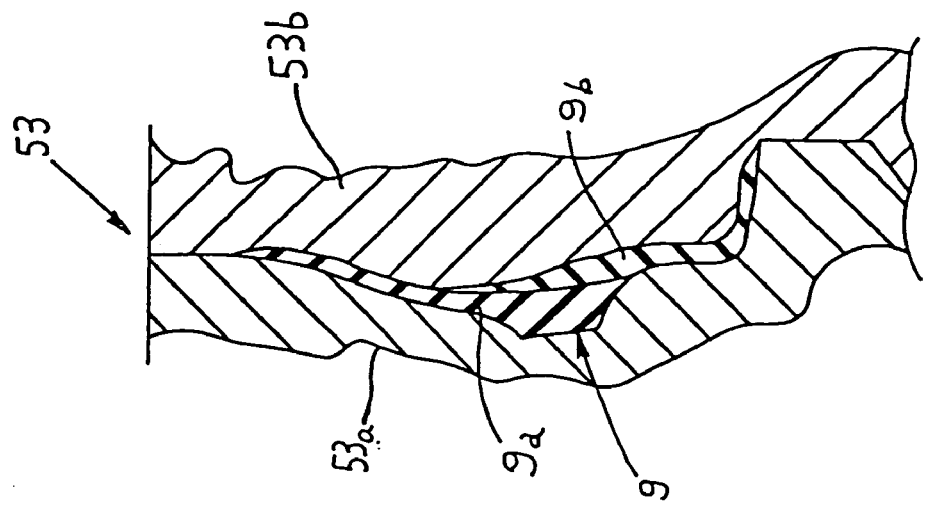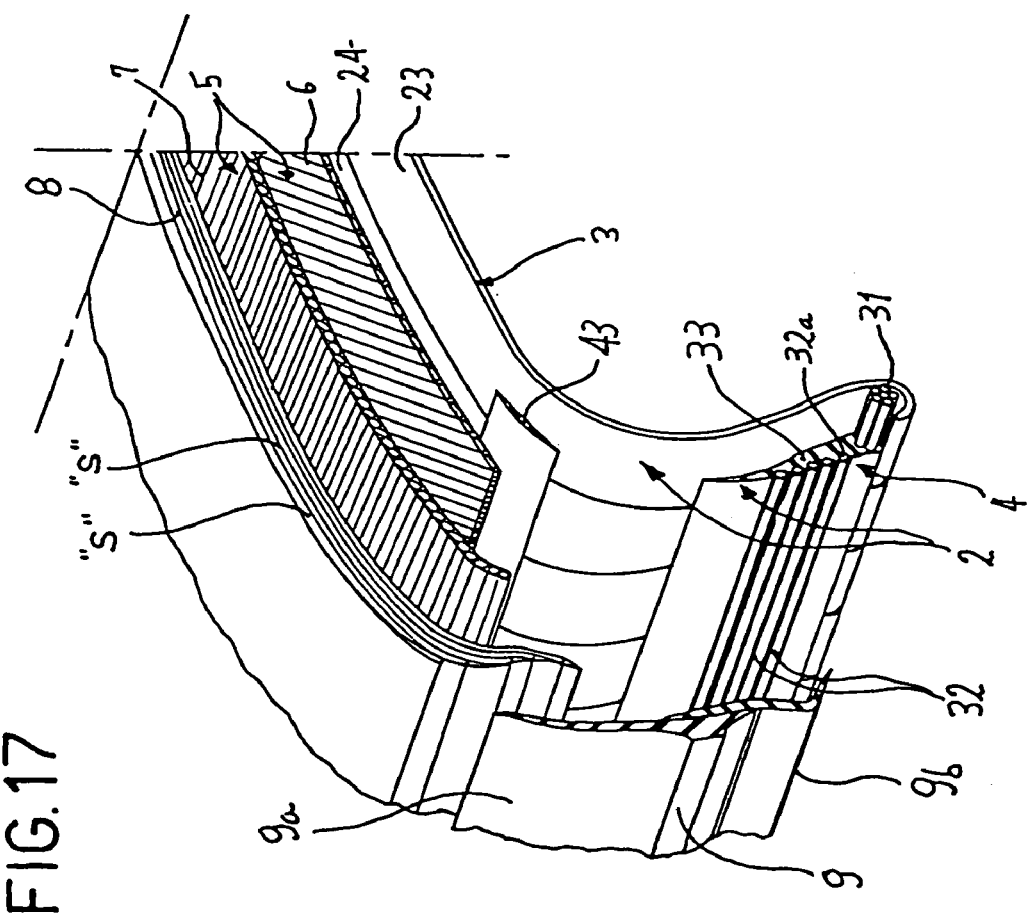

METHOD OF MAKING A TIRE FOR A VEHICLE WHEEL

CROSS-REFERENCE TO RELATED APPLICATIONS

This application is a continuation of U.S. patent application Ser. No. 09/873,330, filed Jun. 5, 2001 now abandoned, in the U.S. Patent and Trademark Office ("USPTO"), which is a continuation of U.S. patent application Ser. No. 09/198,241, filed Nov. 24, 1998 now abandoned, in the USPTO, from both of which Applicants claim the benefit under 35 U.S.C. § 120, and the contents of both of which are relied upon and incorporated herein by reference; additionally, Applicants claim the right of priority under 35 U.S.C. § 119(a)-(d) based on patent application No. 97830633.0, filed Nov. 28, 1997, in the European Patent Office; further, Applicants claim the benefit under 35 U.S.C. § 119(e) based on prior-filed, copending provisional application No. 60/098,380, filed Aug. 28, 1998, in the USPTO.

BACKGROUND OF THE INVENTION

1. Field of the Invention

The present invention relates to a method of making tires for vehicle wheels, comprising the steps of: manufacturing a carcass structure; applying a belt structure to the carcass structure at a circumferentially external position thereof; applying a tread band to the belt structure at a circumferentially external position thereof; applying at least one pair of sidewalls to the carcass structure at laterally opposite positions; vulcanizing the obtained tire.

2. Description of Related Art

Manufacture of tires for vehicle wheels involves formation of a carcass structure essentially consisting of one or more carcass plies substantially having a toroidal conformation and the axially opposite side edges of which engage respective circumferentially inextensible annular reinforcing elements called "bead cores".

Applied to the carcass structure, at a circumferentially external position thereof, is a belt structure comprising one or more belt strips in the form of a closed ring, essentially consisting of textile or metal cords suitably oriented relative to each other and to the cords belonging to the underlying carcass plies.

A tread band currently consisting of a strip of elastomer material of appropriate thickness is applied to the belt structure, at a circumferentially external position thereof. It is to point out that, to the aims of the present invention, by the term "elastomer material" it is intended a rubber blend in its entirety, that is the assembly made up of a base polymer suitably amalgamated with mineral fillers and/or additives of any other type.

Finally, to the opposite sides of the tire being manufactured a pair of sidewalls are applied, each of them covering a side portion of the tire included between a so-called shoulder region, located close to the corresponding side edge of the tread band, and a so-called bead located at the corresponding bead core.

In accordance with traditional production methods, essentially the above-listed tire components are first made separately from each other to be then assembled during a tire-manufacturing step.

For instance, for making the carcass ply or plies to be associated with the bead cores to form the carcass structure, production of a rubberized fabric comprising longitudinally-disposed continuous textile or metallic cords, through an extrusion and/or calendering process, is first required. This rubberized fabric is submitted to a transverse-cutting operation to produce lengths of predetermined sizes that are subsequently joined together so as to give rise to a continuous ribbon-like semifinished product having transversely-disposed parallel cords.

Then this article of manufacture is to be cut into pieces the length of which is correlated with the circumferential extension of the carcass to be made.

Production methods have been recently proposed which, instead of resorting to the production of semifinished products, make the carcass structure directly during the tire-manufacturing step.

For example, U.S. Pat. No. 5,453,140, herein quoted as an example of the pertinent art, discloses a method and an apparatus according to which the carcass structure is formed by laying down a single continuous thread according to alternating deposition paths placed consecutively in side-by-side relationship in a circumferential direction, onto a toroidal support having a shape corresponding to the inner shape of the tire to be made.

In more detail, the toroidal support is previously coated with a raw-rubber layer having a dual function, i.e., that of conveniently adhering to the deposited thread so as to hold the individual deposition sections thereof at a fixed positioning, and that of forming an air-proof inner liner in the finished tire.

The individual thread, directly drawn from a reel, is engaged by sliding members leading it to a movable guide member operating at the toroidal support. The movable guide member moves in a sliding path of travel having an advance section and a return section mutually interconnected to form an endless line lying in a plane radial to the toroidal support. Each of the advance and return sections extends in a substantially C-shaped configuration around the profile in transverse section of the toroidal support.

In this way, each time the guide element covers one of the advance or return sections of the sliding path of travel, deposition of the thread onto the toroidal support is caused, thereby forming a deposition section extending in a U-shaped conformation around the profile in transverse section of the toroidal support itself.

At the instant intervening between formation of a deposition section and formation of the subsequent deposition section, the toroidal support is rotated through a predetermined angular pitch, making the apparatus ready for formation of a new deposition section disposed circumferentially in side-by-side relationship with the previously deposited section.

Pick-up devices making use of fork-shaped elements engage the thread at the end region of the just-formed deposition section, to prevent dragging along of the latter by the guide member during the initial formation step of the subsequent deposition section. Retention devices making use of presser elements conveniently act at the transition region between two deposition sections in succession to cause the end flaps thereof to adhere to the side surface of the toroidal support.

Tires obtained by this production method have a carcass structure in which the cords forming the carcass ply or plies consist of a single thread-like element forming a plurality of consecutive sections transverse to the tire, disposed parallel in side-by-side relationship in a circumferential direction and deposited in respectively opposite directions so as to define an alternated course.

Within the scope of the carcass structure manufacture, as can be learned from Patents EP 0,664,231, and EP 0,664, 232, the deposition sections formed by the individual thread-like element are also provided to be placed in an alternated sequence at axially opposite positions relative to one or more annular anchoring elements constituting said bead cores.

In accordance with the present invention, within the tire-manufacturing scope, different advantages have been found to be achieved if the carcass ply or plies are made by depositing at least one strip-like element essentially comprising a layer of raw elastomer material incorporating two or more parallel thread-like elements disposed longitudinally, in alternated consecutive sections transverse to the tire.

SUMMARY OF THE INVENTION

In more detail, the invention relates to a method of making a tire for vehicle wheels, wherein manufacturing of the carcass structure involves formation of at least one carcass ply by the following steps: preparing at least one continuous strip-like element comprising a plurality of longitudinal and parallel thread-like elements at least partly coated with at least one layer of raw elastomer material; depositing the strip-like element onto a toroidal support in alternated deposition sections each extending according to a substantially U-shaped conformation about the profile in transverse section of the toroidal support, to define two side portions substantially extending in planes orthogonal to a geometric axis of rotation of the toroidal support at mutually-spaced-apart positions in an axial direction, and a crown portion extending in a radially external position between the side portions, the crown portions of each deposition section being disposed consecutively in side-by-side relationship along the circumferential extension of the toroidal support, whereas the side portions of each deposition section are each partly overlapped with a side portion of at least one consecutive deposition section.

In more detail, the side portions in mutual-overlapping relationship are caused to mutually converge toward the geometric axis of rotation of the toroidal support.

Advantageously, mutual overlapping of the side portions of the deposition sections progressively decreases starting from a maximum value at the radially inner ends of the side portions until a zero value at transition regions between said side portions and crown portions.

Preferably, the side portions in mutual-overlapping relationship are maintained joined to each other at a bending end region where the strip-like element is folded upon itself.

In a preferential solution, the individual deposition sections are sequentially laid down onto the toroidal support according to a circumferential distribution pitch corresponding to the width of the strip-like element.

In accordance with a possible alternative embodiment, the individual deposition sections are sequentially laid down onto the toroidal support according to a circumferential distribution pitch corresponding to a multiple of the width of the strip-like element. Preferably, the strip-like element has a width corresponding to a submultiple of the circumferential extension of the toroidal support, as measured at its equatorial plane.

According to a further aspect of the invention, manufacturing of said at least one carcass ply further involves a sequential pressing step of the strip-like element at the side portions of the deposition sections, to define regions of greater width close to the inner circumferential edges of the carcass structure.

Said pressing step is preferably carried out on the strip-like element directly during the deposition step, by exerting a pressing action of the strip-like element at a section thereof upstream of the toroidal support.

Concurrently with said pressing step, moving apart from each other of the thread-like elements comprised in the strip-like element is carried out.

During the deposition step, at least one deposition section comprising an initial or leading end of the strip-like element may be advantageously retained on the toroidal support by a suction action produced through the toroidal support itself.

In particular, formation of each deposition section involves the steps of: guiding the strip-like element on a distributor element movable about the profile in transverse section of the toroidal support; translating the distributor element substantially radially away from the geometric axis of rotation of the toroidal support to form a first side portion of the deposition section of the strip-like element; rotating the toroidal support relative to the distributor element according to an angular pitch corresponding to half the distribution pitch of the deposition sections, concurrently with formation of said first side portion; translating the distributor element substantially in a direction parallel to the geometric axis of rotation of the toroidal support to form the crown portion of the deposition section of the strip-like element; translating the distributor element substantially radially close to the geometric axis of rotation of the toroidal support to form a second side portion of the deposition section of the strip-like element; rotating the toroidal support relative to the distributor element according to said angular pitch, concurrently with formation of said second side portion.

Preferably, during formation of the first side portion of each deposition section the step of retaining the strip-like element at a bending region defined between the first side portion and the second side portion of the previously formed deposition section is carried out.

This retaining step of the strip-like element is, for example, carried out by disposing a retaining element alongside the second side portion after translation of the distributor element radially close to the geometric axis of rotation of the toroidal support, so that the strip-like element is turned back about the retaining element, thereby forming the bending region as a result of translation of the distributor element radially away from the geometric axis of rotation of the toroidal support.

It is also preferably provided that the retaining element should be axially disengaged from the bending region, after starting of formation of the crown portion of the deposition section being made.

Accomplishment of a pressing step of said side portions of the deposition sections against side walls of the toroidal support may be also provided.

This pressing step is preferentially carried out repeatedly on a first and a second side portions belonging to two contiguous deposition sections.

Advantageously, accomplishment of the carcass structure further comprises the step of applying at least one inextensible annular structure to an area close to each of the inner circumferential edges of the carcass ply obtained from the deposition step.

Accomplishment of the carcass structure may further comprise the step of turning back end flaps of the side portions about the respective inextensible annular structures.

In accordance with a further innovator aspect of the invention, that can be also advantageously adopted independently of the above listed innovator features, accomplishment of each inextensible annular structure comprises the steps of: depositing at least one thread-like element in concentric coils into a molding cavity to form a circumferentially inextensible annular insert to be positioned substantially parallel to adjacent surfaces of the carcass ply; positioning an annular anchoring element into the molding cavity, at a position axially close to the circumferentially inextensible annular insert; injecting raw elastomeric material into the molding cavity to make a filling body intimately joined to the annular anchoring element and the circumferentially inextensible annular insert.

Said deposition step may be conveniently preceded by a rubberizing step in which said thread-like element is coated with at least one layer of raw elastomer material.

Preferably, also provided is a step of magnetically retaining the circumferentially inextensible annular insert, at a predetermined position, within the molding cavity.

Injection of the raw elastomer material may be advantageously carried out through at least one circumferential admission opening or hollow space opening into the molding cavity.

According to a possible embodiment, accomplishment of the carcass structure further comprises the step of forming a second carcass ply in the same manner as formation of the first carcass ply.

In accordance with a further aspect of the invention, to be utilized too independently of the above statements, application of the belt structure comprises the steps of: forming at least one continuous belt ribbon comprising at least one layer of raw elastomer material at least partly incorporating a plurality of longitudinal parallel cords; cutting said continuous belt ribbon according to a predetermined inclination relative to its longitudinal extension to form belt lengths having a predetermined size in width, measured perpendicularly to the cutting direction; laying down the belt lengths consecutively in circumferential alignment onto the carcass structure to form at least one first continuous belt strip having said cords disposed transversely according to an inclination corresponding to the cutting inclination of said lengths.

Before said cutting step, the continuous belt ribbon may be possibly submitted to a calendering step to give said lengths a circumferential size corresponding to a submultiple of the circumferential extension of the belt strip.

Application of the belt structure preferentially further comprises the step of forming at least one second belt strip by winding of at least one continuous thread-like element in coils disposed axially in side-by-side relationship and extending circumferentially about the first belt strip.

If required, the winding coils formed by the elongated element can be disposed mutually in side-by-side relationship according to a variable axial-distribution pitch, which is, for example, greater close to the equatorial median plane of the toroidal support relative to the opposite side edges of the belt structure.

Advantageously, application of the tread band may comprise the step of circumferentially wrapping at least one continuous sheet of raw elastomer material about the belt structure in a plurality of radially superposed coils.

Preferably, said continuous sheet of elastomer material is produced simultaneously with its application to the belt structure.

Width of the elastomer-material sheet may be advantageously provided to be progressively reduced concurrently with formation of each winding coil about the belt structure.

In accordance with a further independent aspect of the invention, each of said sidewalls is preferably made by injection of elastomer material into a mold.

In more detail, accomplishment of each of said sidewalls may comprise the following steps: injecting a first elastomer material into a first cavity defined in said mold to form a radially outer portion of the sidewall; defining a second cavity in the mold, which is partly delimited by the radially outer portion of the sidewall; injecting a second elastomer material into the second cavity of the mold to define a radially inner portion of the sidewall.

Formation of the carcass ply may be preceded by a step of coating the toroidal support with at least one air-proof layer or liner of elastomer material.

This coating step is advantageously carried out by winding at least one ribbon-like band of an air-proof elastomer material in coils disposed in side-by-side relationship along the profile in transverse section of the toroidal support.

In addition to, or in place of the formation of the air-proof liner, before the vulcanization step the following steps are carried out: disengaging the tire from the toroidal support; inserting an air tube into the carcass structure.

During said vulcanization step, a step of stretching said carcass plies and belt strips may be advantageously carried out for achieving an expansion of the tire of a linear amount included between 2% and 5%.

BRIEF DESCRIPTION OF THE DRAWINGS

Further features and advantages will be best understood from the detailed description of a preferred but non-exclusive embodiment of a method of manufacturing a tire for vehicle wheels according to the present invention. This description will be given hereinafter with reference to the accompanying drawings, given by way of non-limiting example, in which:

FIGS. 2 and 3 diagrammatically show an apparatus for making the carcass ply, in different operating steps respectively, seen in a direction orthogonal to a diametrical section plane of a toroidal support carrying the tire during the manufacturing step;

FIG. 4 is a diagram showing the manufacture of a strip-like element intended for forming the carcass ply or plies;

FIG. 5 shows an embodiment of said strip-like element in transverse section;

FIG. 6 is a fragmentary perspective view diagrammatically showing the deposition sequence of a strip-like element for the purpose of forming a carcass ply of the tire in accordance with the invention;

FIG. 7 is a fragmentary diametrical section view of an inextensible annular structure to be inserted at the tire bead, during a molding step for manufacturing the tire;

FIG. 8 is a fragmentary perspective view of an inextensible annular structure laterally applied to the carcass ply;

FIG. 14 is a diagram showing formation of a continuous elastomer sheet intended for making a tread band;

FIG. 15 is a fragmentary perspective view in section showing the tread band made by winding the continuous sheet in several superposed coils;

FIG. 16 diagrammatically shows formation of the tire sidewalls in transverse section;

FIG. 17 is a fragmentary perspective view showing application of the sidewalls to the tire during its manufacturing step;

DETAILED DESCRIPTION OF THE EXEMPLARY EMBODIMENTS

Figure 1:
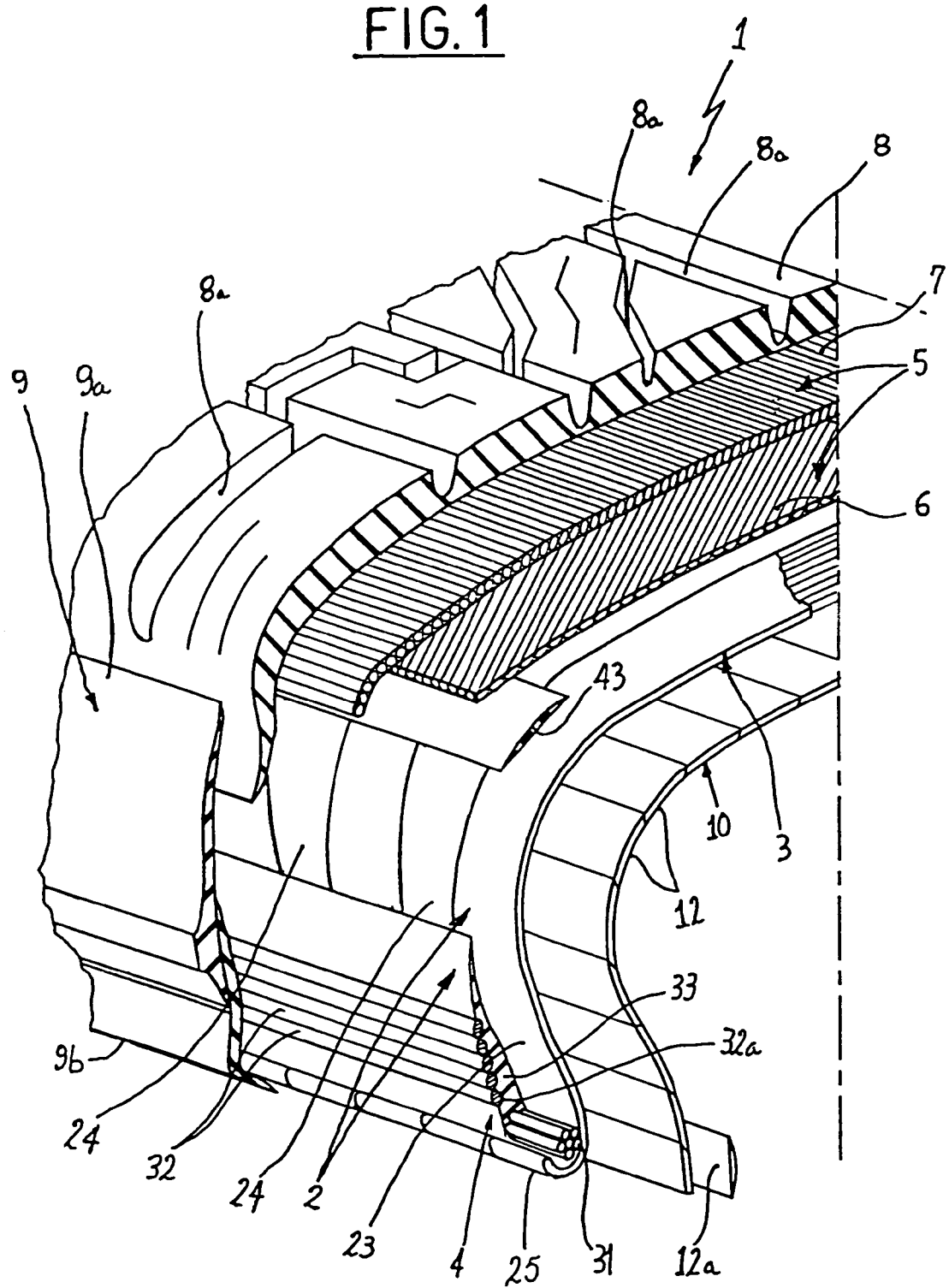
FIG. 1 is a fragmentary perspective view in split of a tire obtained in accordance with the present invention.

With reference to the cited drawings and in particular to FIGS. 1 and 17, a tire for vehicle wheels made by a method in accordance with the present invention has been generally identified by reference numeral 1.

Tire 1 essentially comprises a carcass structure 2 having at least one carcass ply 3 substantially of a toroidal conformation and engaged, by its opposite circumferential edges, with a pair of inextensible annular structures 4 that, when the tire is completed, are located in the region usually identified as "bead".

Applied to the carcass structure 2, at a circumferentially outer position, is a belt structure 5 comprising one or more belt strips 6, 7. A tread band 8 is circumferentially superposed on the belt structure 5 and longitudinal and transverse cuts 8a are formed in said tread band 8, following a molding operation carried out concurrently with the tire vulcanization, and such disposed as to define a desired "tread pattern".

The tire also comprises a pair of so-called "sidewalls" 9 applied laterally to opposite sides of the carcass structure 2.

The carcass structure 2 may possibly be coated, on its inner walls, with an air-proof elastomer-material layer 10, i.e., a so-called "liner", essentially consisting of a layer of elastomer material impervious to air, adapted to ensure the hermetic seal of the inflated tire.

Assembling of the above-listed components, as well as production of one or more of said components, takes place with the aid of a toroidal support 11, diagrammatically shown in FIGS. 2 and 3, having the same configuration as the inner walls of the tire to be manufactured.

In a preferential solution the toroidal support 11 has reduced sizes relative to those of the finished tire, according to a linear amount preferably included between 2% and 5%, measured, just as an indication, along the circumferential extension of the support itself at an equatorial plane X-X thereof which is coincident with the equatorial plane of the tire itself.

The toroidal support 11, which is not described or illustrated in detail in that it is not particularly of importance to the purposes of the invention, may for example consist of a collapsible drum or an inflatable chamber or bladder suitably reinforced so that it may take and maintain the desired toroidal conformation under inflation conditions.

After taking into account the above statements, manufacture of tire 1 first involves formation of the carcass structure 2 starting with possible information of the air-proof layer or liner 10.

This liner 10 can be advantageously made by circumferentially winding about the toroidal support 11 at least one ribbon-like band 12 of air-proof elastomer material, produced from an extruder and/or a calendar located close to the toroidal support itself. As viewed from FIG. 1, winding of the ribbon-like band 12 substantially takes place in circumferential coils disposed consecutively in side-by-side relationship to follow the profile in transverse section of the outer surface of the toroidal support 11.

For descriptive purposes, by "profile in transverse section" it is herein intended a configuration exhibited by the half-section of the toroidal support 11 sectioned along a plane radial to a geometric rotation axis thereof, not shown in the drawings, which is coincident with the geometric axis of rotation of the tire being manufactured.

Concurrently with winding of the ribbon-like band 12, application of a pair of auxiliary annular elements 12a can be carried out close to the inner circumferential edges of the carcass structure during its manufacturing step. Each of these auxiliary annular elements 12a can be obtained, for example, by winding the ribbon-like band 12 in a coil disposed axially side-by-side with the corresponding coil located at the inner perimetric edge of liner 10 defined or to be defined on the toroidal support 11. Alternatively, the auxiliary annular elements 12a can be made up of at least one auxiliary ribbon-like band obtained from a respective extruder located at the toroidal support 11.

In accordance with the present invention, the carcass ply 3 is directly formed on the toroidal support 11 by depositing thereon, following alternating paths, at least one strip-like element 13 preferably having a width included between 3 mm and 15 mm, as better clarified in the following.

As shown in FIG. 4, preparation of the strip-like element 13 essentially involves that two or more thread-like elements 13a, and preferably three to ten thread-like elements 13a, fed from respective reels 14, should be guided through a first extruder 15 associated with a first extrusion apparatus 16 carrying out feeding of raw elastomer material through the extruder itself.

It is pointed out that, in the present description by "extruder" it is intended that part of the extrusion apparatus also identified in this particular field by the term "extrusion head", provided with a so-called "die" passed through by-the product being worked at an outlet port shaped and sized according to the geometrical and dimensional features to be given to the product itself.

The elastomer material and thread-like elements 13a are intimately joined together within the extruder 15, thereby generating the continuous strip-like element 13 at the outlet thereof, which element is formed of at least one layer of elastomer material 13b in the thickness of which the thread-like elements themselves are incorporated.

Depending on requirements, it is possible to guide the thread-like elements 13a in the extruder 15 in such a manner that they are not integrally incorporated into the layer of elastomer material 13b but appear on one or both surfaces thereof.

The thread-like elements 13a may each consist for example of a textile cord preferably having a diameter included between 0.6 mm and 1.2 mm, or a metallic cord preferably having a diameter included between 0.3 mm and 2.1 mm.

Advantageously, if required, the thread-like elements 13*a* can be disposed in the strip-like element 13 in such a manner that they give the carcass ply 3 thus obtained unexpected qualities of compactness and homogeneity. For the purpose, the thread-like elements 13*a* can be for example disposed according to a density greater than six thread-like elements/ centimeter, measured circumferentially on the carcass ply 3 close to the equatorial plane X-X of tire 1. In any case it is preferably provided that the thread-like elements 13*a* should be disposed in the strip-like element 13 according to a mutual distance between centers not lower than 1.5 times the diameter of the thread-like elements themselves, in order to enable an appropriate rubberizing operation between the adjacent threads.

The continuous strip-like element 13 coming out of extruder 15 can be advantageously guided, optionally through a first accumulator-compensator device 17, on a deposition apparatus 18 diagrammatically shown in FIGS. 2 and 3.

The deposition apparatus 18 essentially comprises first guide members 19 consisting, for example, of a pair of rollers borne on stationary rotation axes, arranged to engage the continuous strip-like element 13 produced by the extruder 15. Downstream of the first guide members 19, the strip-like element 13 comes into engagement with second guide members 20 consisting of further rollers, for example, mounted on a movable carriage 21 reciprocating in a direction oriented transversely to the equatorial plane X-X of the toroidal support 11. Slidably linked to the movable carriage 21, in a direction substantially perpendicular to the movement direction of the carriage itself, is at least one distributor element 22 consisting of a further roller, for example.

Components intended for mutual connection and movement of the distributor element 22 and movable carriage 21 are not shown in the accompanying drawings in that they can be made in any manner convenient to a person skilled in the art, and in any case they are not of importance to the aims of the present invention.

By a combination between the transverse movement of movable carriage 21 and radial movement of the distributor element 22, the distributor element lends itself to be translated by a reciprocating motion along a trajectory "t" extending according to a substantially U-shaped conformation about the profile in transverse section of the toroidal support 11.

The toroidal support 11 can be driven in angular rotation in a step-by-step movement in synchronism with the movement of the distributor element 22, in such a manner that the strip-like element 13 is deposited onto the toroidal support in consecutive deposition sections 23, 24, transverse to the tire, disposed parallel in side-by-side relationship in a circumferential direction and according to respectively opposite directions, so as to define an alternating course.

In more detail, each of the deposition sections 23, 24 extends in a U-shaped conformation about the profile in transverse section of the toroidal support 11, to define two side portions 23*a*, 23*c*, 24*a*, 24*c* substantially extending in planes orthogonal to the geometric axis of rotation of the toroidal support, at mutually spaced apart positions in an axial direction, and a crown portion 23*b*, 24*b* extending at a radially outer position relative to the side portions 23*a*, 23*c*, 24*a*, 24*c*.

For convenience in description, the deposition sections obtained as a result of a translation from right to left of the distributor element 22, with reference to FIGS. 2 and 3, will be hereinafter referred to as first deposition sections 23. Those obtained from translation of the distributor element in the opposite direction will be, instead, identified as second deposition sections 24.

In more detail, the deposition sequence of the strip-like element 13 on the toroidal support 11 is the following.

Starting is assumed to take place from an initial situation in which, as shown in FIG. 2, the distributor element 22 is located in its lefthand end-of-stroke position of its movement trajectory "t". Starting from this position, the distributor element 22 is substantially translated radially away from the geometric axis of rotation of the toroidal support 11, to form a first side portion 23*a* of the first deposition section 23.

Due to the sticky character of the raw elastomer material forming layer 13*b* coating the thread-like elements 13*a*, a steady adhesion of the strip-like element 13 on the surfaces of the toroidal support 11 is ensured, even in the absence of liner 10 on the toroidal support itself. In the case that, as diagrammatically shown in FIGS. 2 and 3, the toroidal support 11 has side portions 11*a* of a concave profile, located in the regions corresponding to the sidewalls of the tire being produced, the above described adhesion takes place as soon as the strip-like element 13 comes into contact with the toroidal support itself at a radially external region of its profile in transverse section.

In addition to or in place of the above described exploitation of the natural sticky character of the elastomer material, retention of the strip-like element 13 on the toroidal support 11 can be obtained by carrying out a suction action produced through one or more appropriate holes 28 arranged on the toroidal support.

In the initial step of the distributor-element stroke 22 away from the geometric axis of rotation of the toroidal support 11, the strip-like element 13 is folded upon itself forming a bending region 25 representing a transition between the first side portion 23*a* of the deposition section 23 which is about to be formed and a second side portion 24*b* belonging to a previously formed deposition section 24. During formation of the first side portion 23*a*, the strip-like element 13 is conveniently retained at said bending region 25, by a retention element 26 (FIG. 3) engaging in the bending region in a manner better described in the following.

Concurrently with formation of the first side portion 23*a*, the toroidal support 11 is rotated about its own geometric axis of rotation relative to the distributor element 22, according to an angular pitch corresponding to half the circumferential distribution pitch of the deposition sections 23, 24. Consequently, the first side portion being formed will take a correspondingly inclined orientation relative to the direction of movement performed by the distributor element 22 away from the geometric axis of rotation of the support itself.

In the embodiment diagrammatically shown in FIG. 1, where the circumferential distribution pitch of the individual deposition sections 23, 24 corresponds to the width of the strip-like element 13, the angular-rotation pitch of the toroidal support 11 will correspond to half the width of the strip-like element itself.

In any case, the circumferential distribution pitch of the deposition sections 23, 24 may be provided to correspond to a multiple of the width of the strip-like element 13. In this case, the angular-movement pitch of the toroidal support 11 will in any case correspond to half said circumferential distribution pitch. It is to point out that, to the aims of the present invention, when it is not otherwise stated, the term "circumferential" refers to a circumference lying in the equatorial plane X-X and close to the outer surface of the toroidal support 11.

When the support element 22 comes close to the top of its stroke away from the geometric axis of rotation of the toroidal support 11, the movable carriage 21 is translated in its movement direction from left to right with reference to FIG. 2. Under this circumstance, the distributor element 22 moves in a direction substantially parallel to the geometric axis of rotation of the toroidal support 11 in such a manner that, in a position radially external to the latter, there is formation of a crown portion 23b of the deposition section 23 being made.

When movable carriage 21 has substantially completed its translation stroke, the distributor element 22 is moved substantially radially close to the geometric rotation axis of the toroidal support 11. Under this circumstance, a second side portion 23c of the first deposition section 23 is formed.

Concurrently with formation of this second side portion 23c, the toroidal support 11 is rotated relative to the distributor element 22 at an angular pitch identical with the one previously performed.

When the distributor element 22 is about to complete its stroke of moving close to the geometric rotation axis of the toroidal support 11, a further retention element (not shown) identical with the previously mentioned retention element 26 and in mirror image relationship therewith is disposed alongside the second side portion 23b which has been just formed, in the same manner as shown in chain line in FIG. 3 in connection with the retention element 26 located on the laterally opposite side.

Preferably, the retention element 26 is then laterally moved close to the toroidal support 11, to enable passage of the distributor element 22 during its upward movement, as a result of which, concurrently with formation of a first side portion 24a of a new second deposition section 24, the strip-like element 13 will be turned back about the retention element thereby forming a new bending region 25.

Simultaneously with formation of the first side portion 24a of the second deposition section 24, the toroidal support 11 performs a new angular-rotation step that being added to the angular step performed during deposition of the second side portion 23b of the first deposition section 23, makes the distributor element 22 ready to form the crown portion 24b of the second deposition section 24 at a position spaced apart from the previously formed deposition section 23 according to the desired circumferential distribution pitch.

The retention element 26 is axially disengaged from the bending region 25 after formation of the crown portion 24b has begun. Actually, in this step the assurance exists that the strip-like element 13 has come into contact with the surface of the toroidal support 11 at a point downstream of the just-formed first side portion 24a, and that it is not liable to carry out undesired displacements that could impair the deposition geometry of the strip-like element.

Once the retention element 26 has been drawn out of the bending region 25, the side portions 23c, 24c of the deposition sections 23, 24 can be submitted to a pressing step against the side walls of the toroidal support 11. For the purpose, a pair of presser rollers 27 or equivalent means may be provided, and they operate on opposite sides of the toroidal support 11 and are each arranged so as to repeatedly operate on the first and second side portions belonging to two contiguous deposition sections.

Only one of these presser rollers 27 has been diagrammatically shown in FIG. 3.

The above-described operating sequence of the deposition apparatus 18 enables the crown portions 23b, 24b of each deposition section 23, 24 in the obtained carcass ply 3 to be disposed consecutively in side-by-side relationship along the circumferential extension of the toroidal support 11, whereas the side portions 23a, 23c, 24a, 24c of each deposition section 23, 24 are each disposed in superposition relationship with a side portion of at least one consecutive deposition section. More specifically, the first side portion 23a, 24a of each deposition section 23, 24 is partly superposed on the second side portion 23c, 24c of the previously formed deposition section 23, 24.

As clearly shown in FIG. 6, the side portions 23a, 24c in mutual superposition relationship move towards each other substantially in the direction of the geometric axis of rotation of the toroidal support 11, according to an angle δ the value of which is correlated with the width "L" of the strip-like element 23, 24, and in any case with the circumferential distribution pitch of the deposition sections 23, 24, as well as the difference between a maximum radius R' and a minimum radius R to be measured at a point of maximum distance and a point of minimum distance respectively from the geometric axis of rotation of the toroidal support 11.

Due to the mutual convergence between the first and second contiguous side portions 23a, 24c and 24a, 23c, mutual superposition of the same is progressively decreasing starting from a maximum value at the radially inner ends of the side portions, where said portions mutually meet at the bending region 25, until a zero value at the transition region between the side portions and crown portions 23b, 24b.

It is to note that, due to the difference between the minimum and maximum radii R and R', the average density of the thread-like elements 13a, i.e., the amount of the thread-like elements present in a circumferential section of given length, would have a tendency to progressively increase on moving close to the geometric rotation axis of the toroidal support 11.

Actually, this increase in density is proportional to the ratio value between the maximum radius R' and minimum radius R.

However, in the tire made in accordance with the present invention, mutual superposition of side portions 23a, 24c and 24a, 23c actually gives rise to halving of the average density to be measured along the inner circumferential edges of the obtained carcass ply 3, i.e., at the bending regions 25.

Under this circumstance, the bending portions 25 would be mutually joined in the circumferential direction, giving rise to a homogeneous distribution of the thread-like elements 13a along the inner circumferential edges of the carcass ply 3, only if ratio between the maximum diameter R' and minimum diameter R corresponds to 2.

When, on the contrary, as it usually occurs, the ratio value between the maximum radius R' and minimum radius R is less than 2, the bending portions 25 would tend to arrange themselves according to a circumferential distribution pitch greater than the width of the strip-like element 13, thus giving rise to empty spaces between one bending region 25 and another one.

If the presence of these empty spaces is to be avoided, so as to consequently obtain a maximum structural homogeneity of the carcass ply 3 close to the inner circumferential edges of the carcass ply 3, a pressing step is provided to be sequentially executed on the strip-like element 13 at the regions of its longitudinal extension corresponding to the side portions 23a, 23c, 24a, 24c, so as to define regions of increased width L' on the extension of the strip-like element, which regions are located at the inner circumferential edges of the formed carcass ply 3.

Said pressing action can be carried out by a presser roller 29 mounted on the movable carriage 21, for example, and adapted to be selectively set in motion by an actuator 30 to press the strip-like element 13 against one of the rollers being part of the second guide members 20.

Actuator 30 is sequentially activated during deposition of the strip-like element 13, so as to cause crushing of same at the sections of longitudinal extension intended to form the side portions 23a, 23c, 24a, 24c. Thrust exerted by actuator 30 can be conveniently established in order to obtain an increasingly growing crushing action, for example, on moving close to the bending regions 25 and a progressively decreasing action on moving away therefrom. The crushing action causes a reduction in the thickness of the elastomeric layer 13b and an increase in the width of the strip-like element 13 which, as a result, will cause the thread-like elements 13a to move apart from each other.

By conveniently measuring the thrust action exerted by the actuator, width of the strip-like element 13 can be increased until an amount L' involving mating of each bending region 25 with the adjacent bending regions.

By suitably inclining the orientation of the geometric axis of rotation of the toroidal support 11 relative to the movement direction of the movable carriage 21, the crown portions 23b, 24b of the deposition sections 23, 24 can be given a desired inclination, preferably included between 0° and 15°, and more preferably of about 3°, relative to a radial plane passing by the geometrical axis. It is also to note that, due to the rotation steps carried out by the toroidal support 11 concurrently with the formation of each deposition section 23, 24, the side portions 23a, 23c, 24a, 24c of the deposition section will be inclined at an angle of δ/2 relative to a radial plane crossing the side portions themselves, the first side portions 23a, 24a having an opposite inclination direction with respect to the second side portions 23c, 24c.

Accomplishment of a carcass structure 2 generally comprises the step of applying said inextensible annular structure 4 to an area close to each of the inner circumferential edges of the carcass ply 3 obtained in the previously described manner, for the purpose of creating the carcass regions, known as "beads", which are specifically intended for ensuring anchoring of the tire to a corresponding mounting rim; in accordance with a preferred embodiment of the tire, the carcass ply thereof is obtained in the above described manner.

Each of these inextensible annular structures 4 (FIG. 7) comprises an annular anchoring element 31, of the type usually called "bead core", which can be made up, for example, of one or more metallic wires twisted together or wound in side-by-side coils to define a profile of substantially circular or quadrangular transverse section.

In accordance with a preferred embodiment, to be also advantageously associated with the present invention, a circumferentially inextensible annular insert 32 is combined with the bead core 31 and it approximately extends in a plane parallel to the adjacent surfaces of the carcass ply 3 along a radial extension determined by the difference between the minimum inner radius and the maximum outer radius of the annular insert, preferably equal to at least twice the radial extension of the bead core 31 or in any case greater than the latter.

In a first embodiment shown in FIGS. 1, 8, 15, 17, and 19, the inextensible annular insert 32 is located at an axially outer position relative to the bead core 31. In other words, the annular insert 32 is located, with respect to the bead core 31, at a laterally opposite position relative to the equatorial plane X-X.

Figure 18:
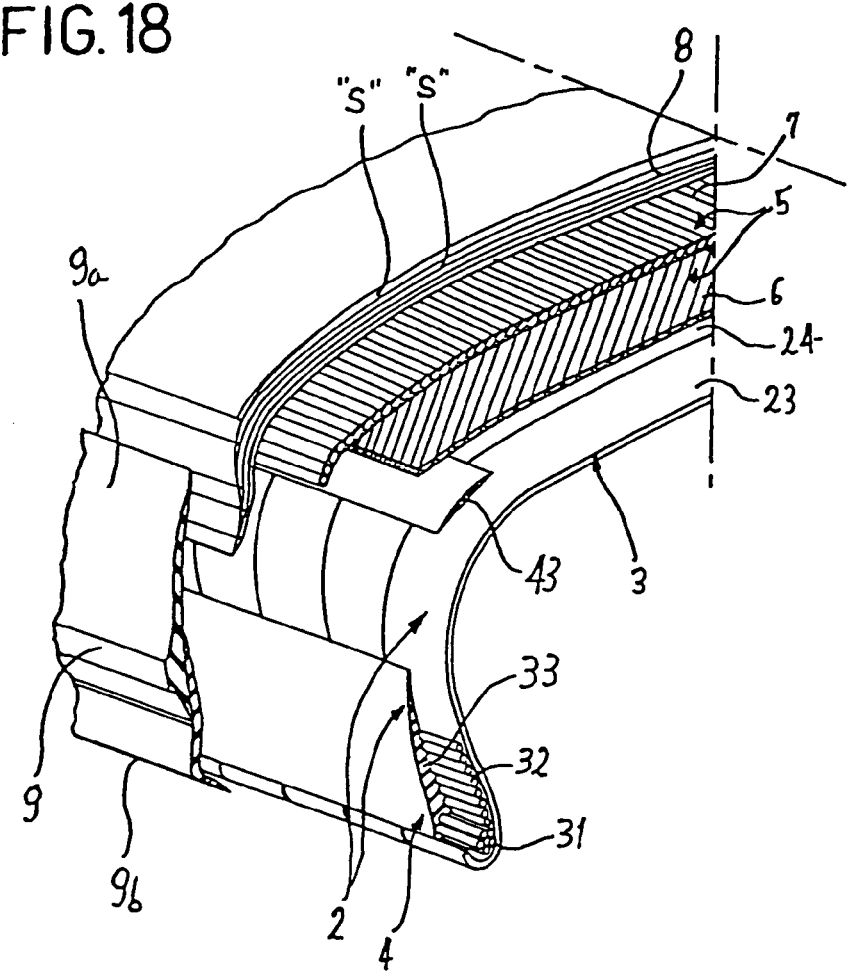
FIG. 18 is a fragmentary perspective view in section showing the tire in reference provided with an inextensible annular structure made in accordance with an alternative embodiment of the invention.

In a possible alternative solution, shown in FIG. 18, the inextensible annular insert 32 is, on the contrary, located at an axially inner position relative to the bead core 31, i.e., on the side facing the equatorial plane X-X. In this case, the annular insert 32 preferably substantially extends in contact with the adjacent carcass ply 3.

The annular insert 32 is made up of at least one metallic wire wound up to form several substantially concentric coils 32a. Coils 32a can be defined by a continuous spiral or by concentric rings formed of respective metallic wires.

Advantageously, during the tire use, the inextensible annular insert 32 is adapted to efficiently counteract the bead tendency to rotate about the profile in transverse section of the bead core 31, under the effect of slip thrusts directed parallel to the rotation axis of tire 1. This tendency to rotation is particularly apparent when the tire is employed under conditions of partial or total deflation.

Preferably, for accomplishment of each annular structure 4, first the inextensible annular insert 32 is formed within a molding cavity 34 defined in a mold 34a, 34b, by deposition of at least one thread-like element in concentric coils 32a disposed in mutual side-by-side relationship, according to circumferences of increasingly growing diameter about their geometric winding axis corresponding to the rotation axis of the tire.

This operation can be advantageously performed by winding the thread-like element in a helical seating arranged in a first cheek 34a of molding cavity 34 which, for the purpose, can be driven in rotation about its own geometric axis.

The deposition step of the thread-like element can be advantageously preceded by a rubberizing step in which the thread-like element, preferably of metallic material, is coated with at least one layer of raw elastomeric material that, in addition to ensuring an excellent rubber-metal bond on the thread-like element itself, promotes adhesion thereof for a steady placement in the above mentioned helical seating.

The first cheek 34a may be also advantageously provided to be made of a magnetic material, or to be activated in an electromagnetic manner so as to attract and retain the thread-like element against itself, thereby ensuring a steady positioning of the coils 32a formed by it.

The bead core 31 is then located within the molding cavity 34 and afterwards closure of the molding cavity 34 is carried out by moving the first cheek 34a close to a second matching cheek 34b. The molding cavity 34 is then filled with a raw elastomer material adapted to form a filling body 33 intimately joined to the bead core 31 and the circumferentially inextensible annular insert 32.

Preferably, filling of the molding cavity 34 is carried out by injecting the raw elastomer material through at least one annular injector comprising an admission opening or hollow space 35 substantially extending over the whole circumferential extension of the molding cavity. In this way, a quick and homogeneous filling of the molding cavity 34 occurs, without the risk of stratification phenomena that could arise in the elastomer material if the latter were obliged to pass through admission channels of reduced section. It is to note that the admission hollow space 35 may be comprised of a plurality of slits homogeneously distributed along the whole circumferential extension of the molding cavity 34, so as to give rise, in any case, to a quick and homogeneous filling of the molding cavity.

Accomplishment of the inextensible annular structures 4 may advantageously take place close to the toroidal support 11, so that said structures lend themselves to be picked up and laterally applied to the carcass ply 3 by appropriate mechanical handling devices not described as not of importance to the aims of the invention.

When application of the inextensible annular structures 4 has been completed, either the carcass ply or plies, or, within the scope of the present invention, the side portions 23a, 23c, 24a, 24c of the deposition sections 23, 24 are provided to have respective end flaps radially projecting towards the geometric rotation axis of the toroidal support 11 relative to the inextensible annular structures. These end flaps, substantially identified close to said bending regions 25, are turned back about the respective inextensible annular structures 4, as viewed from FIG. 8.

This turning-back step can be for example carried out with the aid of inflatable chambers or equivalent means associated with the toroidal support 11. The amount by which said end flaps project and consequently the width of the turned-back flap formed by same can be easily established in advance by suitably adjusting the radial-movement stroke of the distributor element 22 or the radial positioning of the retention elements 26, so as to modify the width of the side portions 23a, 23c, 24a, 24c in a radial direction.

Accomplishment of the carcass structure 2 can involve formation of at least one auxiliary carcass ply, not shown in the accompanying drawings. This auxiliary carcass ply can be directly formed in superposed relationship upon the carcass ply 3 and the inextensible annular structures 4, in the same manner as the primary carcass ply, optionally with deposition sections disposed in a crossed orientation relative to the deposition sections 23, 24 forming the first carcass ply 3.

In tires of the radial type, a belt structure 5 is currently applied to the carcass structure 2.

Advantageously, in a novel and inventive manner, application of the belt structure 5 is provided to be substantially directly carried out on the carcass structure 2 which in a preferred embodiment of the invention can be made as previously described.

Figure 10:
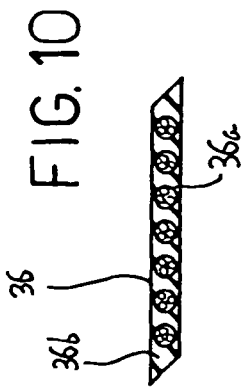
FIG. 10 is a transverse section view of said continuous belt ribbon.
Figure 9:
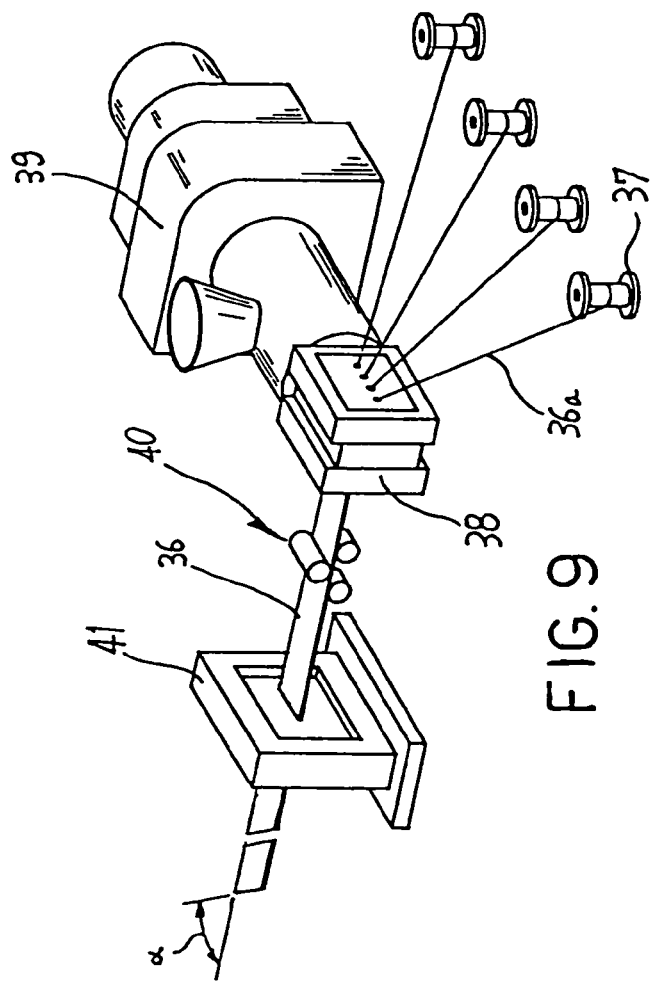
FIG. 9 is a diagram showing accomplishment of a continuous ribbon and cutting of same into lengths of predetermined shape and sizes for making a first belt strip.

For the purpose, as diagrammatically shown in FIGS. 9 and 10, formation of at least one continuous belt ribbon 36 is provided, which comprises a plurality of longitudinal parallel cords 36a, of metallic material for example, at least partly incorporated into one or more layers of raw elastomer material 36b.

Formation of the continuous belt ribbon 36 can be achieved for example by guiding the cords 36a, fed from respective reels 37, through a second extruder 38, into which the elastomer material from a second extrusion apparatus 39 flows. The continuous belt ribbon 36 emerging from the second extruder 38, after possible passage through first calendering rollers 40, is caused to pass through a cutting-off machine 41 cutting it according to a given inclination a relative to its longitudinal extension, to form belt lengths 42 the size in width of which, measured perpendicularly to the cutting direction, corresponds to the width of at least one first belt strip 6 to be obtained on the carcass structure 2.

Lengths 42 are individually and sequentially laid down onto the carcass structure 2 consecutively in a circumferential alignment and in mutual side-by-side relationship along respective junction edges 42a parallel to cords 36a and corresponding to the opposite longitudinal edges of the belt ribbon 36.

Figure 11:
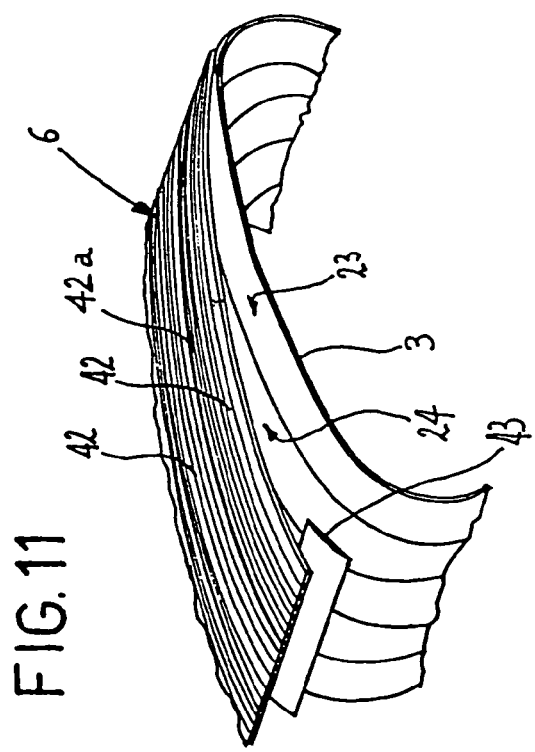
FIG. 11 is a fragmentary perspective view showing deposition of the ribbon lengths in a circumferential alignment onto the carcass structure for formation of said first belt strip.

Therefore the assembly of lengths 42 forms the first belt strip 6 of a continuous circumferential extension. As diagrammatically shown in FIG. 11, in the first belt strip 6, cords 36a will be disposed transversely at an inclination corresponding to the cutting inclination of lengths 42.

Preferably this inclination has a value corresponding to approximately 80° and, in any case, included between 45° and 90° relative to the circumferential extension direction, optionally with an opposite orientation relative to the underlying carcass ply 3.

In order that the first belt strip 6 consisting of lengths 42 of same extension may have a homogeneous and continuous circumferential course, the continuous belt ribbon 36 emerging from the second extruder 38 may be provided to have a transverse extension, measured parallel to the cutting direction, equal to a submultiple of the circumferential extension of the first belt strip. Alternatively, said transverse extension may be provided to be slightly lower than the value of the above mentioned submultiple, being then suitably increased by the calendering action carried out by rollers 40.

In conclusion, by suitably intervening on the calendering rollers 40, the width of the continuous belt ribbon 36 may be adapted in such a manner that the obtained lengths 42 shall have an extension corresponding to a submultiple of the circumferential course of the belt strip 6 to be made, without replacement of extruder 38 being required.

It is to point out that by the calendering operation, an increase in the distance between the individual cords 36a is obtained, concurrently with an increase in width of the continuous belt ribbon 36, said individual cords 36a remaining in any case spaced apart the same distance from each other.

The above described operating sequence can be repeated in the same manner if formation of one or more additional first belt strips, not shown in the accompanying drawings, is required, the cords of which would be inclined according to a crossed orientation relative to the cords 36a of the first belt strip 6 and/or adjacent strips.

In a manner known per se, formation of the first belt strip or strips 6 can be preceded by application of two strip-like inserts 43 adapted to support the opposite side edges of the first belt strips so that the latter may substantially keep a flat profile in transverse section.

Therefore, at least one second belt strip 7 is made, preferably by winding of at least one continuous elongated element 44 in the form of coils disposed axially in side-by-side relationship and extending circumferentially about the first belt strip 6.

If required, the winding coils formed by the elongated element 44 can be disposed side-by-side in a variable axial distribution pitch which, for instance, is greater close to the equatorial median plane X-X of the tire relative to the opposite side edges of the belt structure 5.

Figure 12:
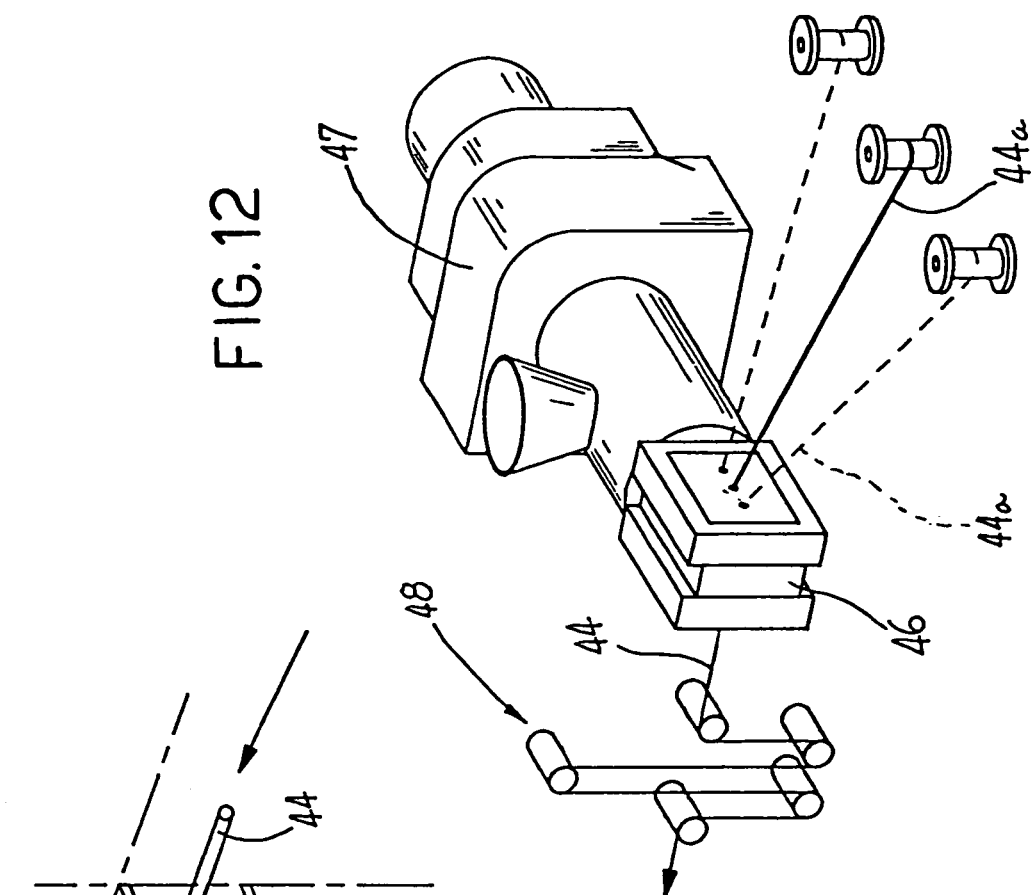
FIG. 12 is a diagram referring to production of a rubberized elongated element intended for making a second belt strip.
Figure 13:
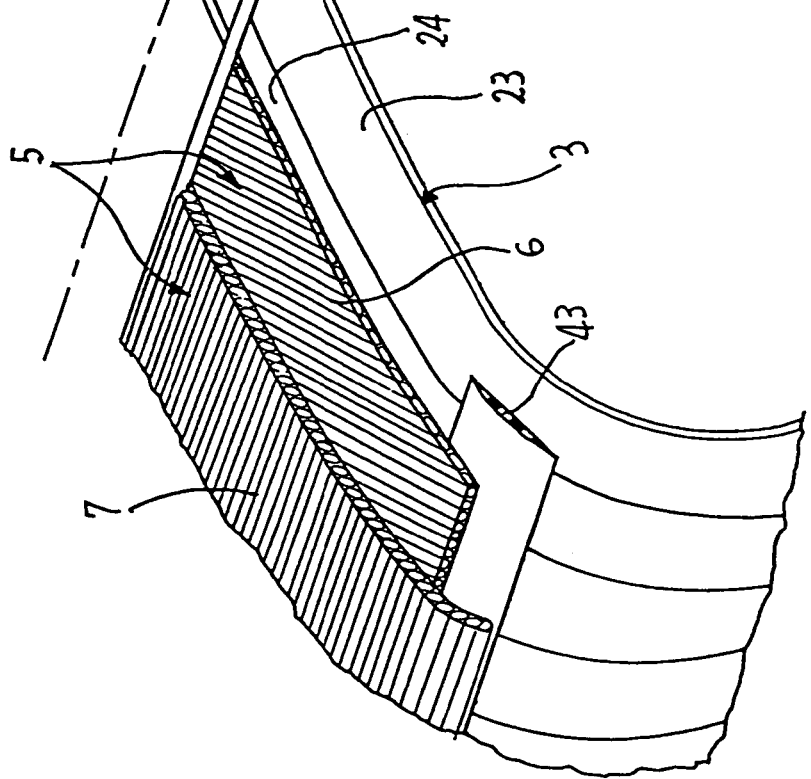
FIG. 13 is a fragmentary perspective view in section showing the step of forming said second belt strip by the continuous elongated element.

As diagrammatically shown in FIG. 12, for preparation of the continuous elongated element 44, one or more elementary cords 44a fed from corresponding reels 45 are parallel joined together and rubberized by passage through a third extruder 46 supplied with elastomer material from a third extrusion apparatus 47.

The elongated element 44 thus obtained has one or more elementary cords 44a coated with an elastomer material of appropriate thickness and is ready to be wound around the first belt strip 6, after possible passage through a storage device 48.

In a convenient embodiment, said cords are the well known metallic cords of the HE (high ultimate elongation) type, use and features of which have already been widely described in the European Patent 0 461 464 in the name of the same Applicant, for example.

In more detail, these cords consist of a given number of strands, each strand being formed of a given number of individual wires of a diameter not lower than 0.10 mm and not higher than 0.40 mm, preferably included between 0.12 mm and 0.35 mm. Wires in the strands and strands in the cord are helically wound together in the same direction, the winding pitches for wires and strands being the same or even different.

Preferably, these cords are made of high-carbon (HT) steel wires, i.e., containing carbon to an extent not lower than 0.9%.

In a specific embodiment, particularly advantageous in the case of tires for road haulage, said helical layer winding is preferably made of a single cord known as 3×4×0.20 HE HT cord spiraled from one belt end to the other: said indication identifies a metallic cord formed of 3 strands each-consisting of four elementary wires of a diameter of 0.20 mm wound in the same direction as the strands; then, as known, abbreviation HE stands for "high elongation" and abbreviation HT stands for "high tensile".

These cords have an ultimate elongation included between 4% and 8% and a well-known typical behavior under tension, a so-called "spring behavior".

In an alternative embodiment, specifically adopted with tires for cars, said winding is carried out with textile cords preferably of a heat-shrinkable material, such as NYLON 6 or NYLON 66, for example.

Then the tread band 8 is applied to the belt structure 5 obtained in the above described manner.

In more detail, according to a further aspect of the present invention, the tread band 8 is directly formed about the belt structure 5 by circumferential winding of at least one continuous sheet of raw elastomer material 49 about the belt structure in a plurality of radially superposed coils, as diagrammatically shown in FIG. 15.

The continuous sheet of elastomer material can be advantageously made with the aid of a fourth extruder 50 supplied from a fourth extrusion apparatus 51. Sheet 49 emerging from the fourth extruder 50 can be engaged by a further calendering unit 52, immediately downstream of which the toroidal support 11 carrying the tire being manufactured may be arranged, to enable direct winding of the elastomer sheet around the belt structure 5.

By appropriate cutting means associated with the calendering unit 52 and/or by shutting means operating at the outlet of the fourth extruder 50 (both not shown as they can be made in any convenient manner for a person skilled in the art), the width of the elastomer material sheet 49 can be advantageously progressively reduced concurrently with formation of each winding coil "S" around the belt structure 5, so that the elastomer sheet has a progressively decreasing width away from the rotation axis of tire 1. Actually, with reference to FIG. 15, it can be easily assumed that the radially outer coils "S" have a smaller width than the radially innermost coils, so as to give the obtained tread band 8 a desired transverse profile.

After accomplishment of the tread band 8 or optionally before this operating step, application of sidewalls 9 made in the manner diagrammatically shown in FIGS. 16 and 17, is carried out. In the embodiment shown, each sidewall 9 is made by injection of elastomer material into another mold 53, from which said sidewall is taken up and subsequently laterally applied to the carcass structure 2 with the aid of mechanical handling devices or the like.

In the embodiment shown, each sidewall 9 has a radially outer portion 9*a* and a radially inner portion 9*b* made of different types of elastomer material and intimately joined together by an overmolding process. For the purpose, mold 53 essentially has an outer cheek 53*a* and a pair of inner cheeks 53*b* which are mutually interchangeable and only one of which is shown in the drawings.

The outer cheek 53*a* is first coupled with a first inner cheek (not shown) to define a first cavity within the mold, in which cavity, by injection of a first elastomer material, the radially outer portion 9*a* of the sidewall 9 is formed. The first inner cheek of mold 53 is then replaced by the second inner cheek, so shaped that, in the mold, a second cavity partly delimited by the previously-molded radially outer portion 9*a* is defined. This second seating is intended for receiving the radially inner portion 9*b*, which is formed by injection of a second elastomer material.

Each of the sidewalls 9 formed in the above described manner lends itself to be laterally applied to the carcass structure 2, as above described.

Tire 1, thus manufactured, is now ready to be removed from the toroidal support 11 to be submitted to a vulcanization step that can be executed in any known and conventional manner.

According to a possible alternative embodiment, an air tube of closed tubular section may be advantageously associated with tire 1 in addition to, or in place of, liner 10 before the vulcanization step. The air tube is inserted into carcass structure 2 after the tire has been removed from the toroidal support 11. This air tube, not shown in the accompanying drawings, will be inflated after the tire has been introduced into a vulcanization mold to supply an inner pressure adapted to ensure a perfect adhesion of the tire against the mold walls and, in particular, against the mold parts intended for defining the longitudinal and transverse cuts 8*a* of the tread pattern.

According to a further preferential feature of the present invention, during the vulcanization step the carcass plies 3 and belt strips 6, 7 are submitted to a stretching step to achieve a pre-tensioning thereof, giving rise to a tire expansion according to a linear extent measured on the circumferential extension at the equatorial plane X-X of the tire itself included, just as an indication, between 2% and 5%. This stretching step can be achieved by effect of the inflation pressure of the above mentioned air tube, or other type of inflatable chamber or bladder employed in the vulcanization apparatus.

The present invention achieves important advantages.

Actually, the tire in reference can be obtained through manufacture of the different components directly on a toroidal support on which the tire is gradually formed or, in any case, very close thereto. In this way, all problems connected with manufacture, storage, and management of semifinished products which are common to manufacturing processes of the traditional type are eliminated.

It is to note, in particular, that formation of the carcass ply or plies by deposition of a strip-like element formed of several cords incorporated into one elastomer layer enables important advantages to be achieved. First of all, in comparison with the method described in the above mentioned U.S. Pat. No. 5,453,140, the manufacturing time for each carcass ply can be greatly reduced due to the simultaneous deposition of as many thread-like elements as there are contained in the strip-like element 13. Employment of the strip-like element 13 also dispenses with the need for previously depositing liner 10 onto the toroidal support. Actually, the elastomer layer 13*b* employed in forming the strip-like element 13 is capable, by itself, to ensure an efficient adhesion of strip-like element 13 to the toroidal support 11, thereby ensuring a steady positioning of the individual deposition sections 23, 24.

Positioning accuracy, as regards the deposition sections and the thread-like elements integrated thereinto, is further improved by the fact that the strip-like element has an important structural consistency that makes it insensitive to vibrations or similar oscillation effects that can be transmitted by the deposition apparatus 18. In this connection, it is to note that deposition of an individual thread-like element, as described in U.S. Pat. No. 5,453,140, makes it difficult to obtain an accurate deposition of each thread section, due exactly to vibrations and/or oscillations undergone by said thread during the deposition step.

Furthermore, simultaneous deposition of a plurality of thread-like elements in accordance with the invention enables the deposition apparatus 18 to be operated at slower rates than required when deposition of the individual thread is concerned, which is a further advantage in terms of working accuracy without, on the other hand, impairing productivity.

Besides, deposition of a strip-like element directly crownwise to a toroidal support of a profile substantially identical with that of the finished tire enables densities to be achieved that cannot be reached in the art by known methods providing deposition of a carcass ply in the form of a cylindrical sleeve and subsequent shaping of same into a toroidal form, which will consequently bring about thinning of the carcass ply cords disposed crownwise to the finished tire.

In addition to the above, the strip-like element can be steadily fastened to the toroidal support by a vacuum effect produced through possible holes 28, which steady fastening by vacuum cannot be achieved by known processes carrying out deposition of an individual thread.

The inclined arrangement of side portions 23a, 23c, 24a, 24c enables expansion undergone by the tire during the stretching step imposed to it on vulcanization to be efficiently helped. Actually, during this step, the side portions tend to take an orientation in a plane radial to the tire together with the crown portions 23b, 24b extending between the side portions.

Mutual superposition of the side portions close to the rotation axis of the tire greatly strengthen the tire structure close to beads, where a greater structural strength is usually required.

Attention is also drawn to the original construction character of the inextensible annular structures 4 disposed at the beads. In particular, due to the presence of the circumferentially inextensible annular inserts 32 combined with conventional bead cores 31, tendency of the bead to rotate by effect of slip thrusts is efficiently prevented. In the known art, this phenomenon led the tire to slip off the respective security hump arranged in the rim, above all when the tire was submitted to slip thrusts under partial-deflation conditions. By arrangement of the annular inserts 32, this drawback is eliminated and the tire lends itself to be employed even under conditions of practically complete deflation without the occurrence of undesired removal of the bead from its seat.

Figure 19:
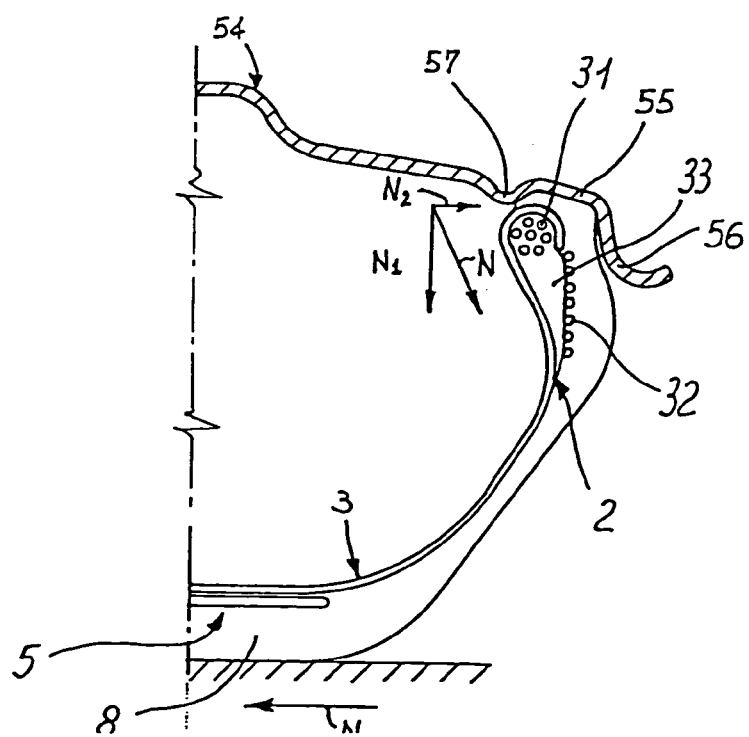
FIG. 19 is a transverse half-section showing a tire in accordance with the invention mounted on a respective rim and in a condition of slip run.

Behavior of the tire bead in accordance with the present invention during running in slip is diagrammatically shown in FIG. 19, showing tire 1 in transverse half-section, associated with a standard mounting rim 54 which, at each of the tire beads, has a bead seat 55 axially delimited by a flange 56 defining an outer side edge of the rim and a security hump 57. For the sake of clarity, section hatching has been purposely omitted from tire 1 shown in FIG. 19.

As can be easily viewed from said figure, the presence of the inextensible annular insert 32 prevents the tire bead from rotating under the effect of the slip thrust N directed parallel to the tire axis, turning on its resting point against the security hump 57 arranged in rim 54. Under this situation, the slip thrust N, transmitted along the carcass ply 3 until close to the bead core 31, gives rise to a radial component $N_1$, which tends to move the bead away from the bead seat 55 and is counteracted by the circumferential inextensibility of the annular structure 4, as well as to an axial component $N_2$, tending to push the bead against the circumferential flange 56, ensuring maintenance of a steady positioning of same.

In this way the tire having beads made in accordance with the present invention lends itself to bear the so-called "J-curve Test" without removal of the bead from its seat until inflation pressures of 0.5 bar, whereas in the known art tires that are unable to counteract bead displacements from their seats at pressures lower than 0.8-1.0 bar are considered as acceptable.

It is also to note that annular inserts 32 supply a further structure protection to the tire at the beads.

What is claimed is:

1. A method of making a tire, comprising:
    making a carcass structure;
    applying a belt structure to the carcass structure at a circumferentially external position of the carcass structure;
    applying a tread band to the belt structure at a circumferentially external position of the belt structure;
    applying at least one pair of sidewalls to the carcass structure at laterally opposite positions; and
    vulcanizing the tire;
    wherein making the carcass structure involves formation of a first carcass ply, comprising:
        preparing at least one continuous strip element comprising a plurality of longitudinal and parallel thread elements at least partly coated with at least one layer of elastomeric material; and
        depositing the at least one strip element onto a toroidal support in alternating deposition sections;
    wherein each deposition section extends in a substantially U-shaped conformation against a profile in transverse section of the toroidal support or a previously deposited deposition section to define two side portions and a crown portion,
    wherein the side portions substantially extend in planes orthogonal to a geometric axis of rotation of the toroidal support at mutually-spaced-apart positions in an axial direction,
    wherein the crown portion extends in a radially external position between the side portions,
    wherein the crown portions of the deposition sections are arranged consecutively in side-by-side relationship along a circumferential extension of the toroidal support,
    wherein the side portions of each deposition section partly overlap or are partly overlapped by a side portion of at least one consecutive deposition section,
    wherein formation of the a first carcass ply further comprises pressing the at least one strip element at the side portions of the deposition sections to define regions of greater width close to radially inner circumferential edges of the carcass structure, and
    wherein the pressing is carried out on the at least one strip element during depositing the at least one strip element by exerting a pressing action on a section of the at least one strip element before that section is deposited onto the toroidal support.

2. The method of claim 1, wherein the side portions in mutual-overlapping relationship mutually converge toward the geometric axis of rotation of the toroidal support.

3. The method of claim 1, wherein mutual overlapping of the side portions of the deposition sections progressively decreases starting from a maximum value at radially inner ends of the side portions until a zero value is reached at transition regions defined between the side portions and the crown portion.

4. The method of claim 1, wherein the side portions in mutual-overlapping relationship are joined to each other at a bending end region where the at least one strip element is folded upon itself.

5. The method of claim 1, wherein each deposition section is sequentially laid down onto the toroidal support according to a circumferential distribution pitch corresponding to a width of the at least one strip element.

6. The method of claim 1, wherein each deposition section is sequentially laid down onto the toroidal support according to a circumferential distribution pitch corresponding to a multiple of a width of the at least one strip element.

7. The method of claim 1, wherein concurrently with pressing the at least one strip element, the thread elements comprised within the at least one strip element are mutually moved apart.

8. The method of claim 1, wherein during depositing the at least one strip element, at least one deposition section comprising an initial or leading end of the at least one strip element is retained on the toroidal support by a suction action produced through the toroidal support.

9. The method of claim 1, wherein depositing each strip element onto the toroidal support comprises:
guiding the strip element on a distributor element movable about the profile in transverse section of the toroidal support;
translating the distributor element substantially radially away from the geometric axis of rotation of the toroidal support to form a first side portion of the deposition section of the strip element;
rotating the toroidal support relative to the distributor element according to an angular pitch corresponding to one half of a distribution pitch of the deposition section, concurrently with formation of the first side portion;
translating the distributor element substantially in a direction parallel to the geometric axis of rotation of the toroidal support to form the crown portion of the deposition section of the strip element;
translating the distributor element substantially radially close to the geometric axis of rotation of the toroidal support to form a second side portion of the deposition section of the strip element; and
rotating the toroidal support relative to the distributor element according to the angular pitch, concurrently with formation of the second side portion.

10. The method of claim 9 wherein during formation of the first side portion of each deposition section, the strip element is retained at a bending region defined between the first side portion and a second side portion of a previously formed deposition section.

11. The method of claim 10, wherein retention of the strip element is carried out by arranging a retaining element alongside the second side portion after translation of the distributor element radially close to the geometric axis of rotation of the toroidal support, so that the strip element is turned back about the retaining element, forming the bending region as a result of translation of the distributor element radially away from the geometric axis of rotation of the toroidal support.

12. The method of claim 11, wherein the retaining element is axially disengaged from the bending region after beginning formation of the crown portion of the deposition section being deposited.

13. The method of claim 1, further comprising pressing the side portions of the deposition sections against side walls of the toroidal support.

14. The method of claim 13, wherein pressing the side portions is carried out repeatedly on first and second side portions of two contiguous deposition sections.

15. The method of claim 1, further comprising applying at least one inextensible annular structure to an area close to inner circumferential edges of the first carcass ply.

16. The method of claim 15, further comprising turning back end flaps of the side portions about respective inextensible annular structures.

17. The method of claim 1, further comprising forming a second carcass ply in a similar manner to formation of the first carcass ply.

18. The method of claim 1, wherein applying the tread band comprises circumferentially winding at least one continuous sheet of elastomeric material about the belt structure in a plurality of radially superposed coils.

19. The method of claim 18, wherein the at least one sheet of elastomeric material is produced during winding of the at least one sheet of elastomeric material about the belt structure.

20. The method of claim 18, further comprising progressively reducing a width of the at least one sheet of elastomeric material concurrently with winding each coil about the belt structure.

21. The method of claim 1, wherein each of the sidewalls is made by injection of elastomeric material into a mold.

22. The method of claim 21, wherein making each sidewall comprises:
injecting a first elastomeric material into a first cavity defined in the mold to form a radially outer portion of the sidewall;
defining a second cavity in the mold, partly delimited by the radially outer portion of the sidewall; and
injecting a second elastomeric material into the second cavity of the mold to define a radially inner portion of the sidewall.

23. The method of claim 1, wherein formation of the first carcass ply is preceded by coating the toroidal support with at least one air-proof layer or liner of elastomeric material.

24. The method of claim 23, wherein coating the toroidal support comprises winding at least one ribbon band of an air-proof elastomeric material in coils arranged in side-by-side relationship along the profile in transverse section of the toroidal support.

25. The method of claim 1, wherein the following are carried out before vulcanizing the tire:
disengaging the tire from the toroidal support; and
inserting an air tube into the carcass structure.

26. The method of claim 1, wherein during vulcanizing the tire, the first carcass ply and the belt structure are stretched to achieve an expansion of the tire of a linear amount between 2% and 5%.

27. The method of claim 1 further comprising:
applying at least one inextensible annular structure to an area close to inner circumferential edges of the first carcass ply;
wherein the formation of the first carcass ply occurs before applying the at least one annular structure to the area close to the inner circumferential edges of the first carcass ply.

28. The method of claim 1, wherein the at least one strip element is deposited onto an exterior surface of the toroidal support or a previously deposited deposition section.

29. The method of claim 1, wherein the crown portions of consecutive deposition sections are parallel to each other.

30. The method of claim 1, wherein a crown section of each carcass ply comprises a single layer of the deposition sections.

31. The method of claim 1, wherein for consecutive deposition sections, a side portion of a second-deposited section disposed farther from an equatorial plane of the tire overlaps a side portion of a first-deposited section disposed closer to the equatorial plane of the tire.

* * * * *